United States Patent
Yücer et al.

(10) Patent No.: US 9,747,668 B2
(45) Date of Patent: Aug. 29, 2017

(54) RECONSTRUCTION OF ARTICULATED OBJECTS FROM A MOVING CAMERA

(71) Applicant: Disney Enterprises, Inc., Burbank, CA (US)

(72) Inventors: Kaan Yücer, Zürich (CH); Alexander Sorkine Hornung, Zürich (CH); Oliver Wang, Zürich (CH); Olga Sorkine Hornung, Zürich (CH)

(73) Assignees: DISNEY ENTERPRISES, INC., Burbank, CA (US); ETH ZÜRICH (EIDGENÖESSISCHE TECHNISCHE HOCHSCHULE ZÜRICH), Zürich (CH)

( * ) Notice: Subject to any disclaimer, the term of this patent is extended or adjusted under 35 U.S.C. 154(b) by 0 days.

(21) Appl. No.: 15/003,650

(22) Filed: Jan. 21, 2016

(65) Prior Publication Data

US 2017/0213320 A1    Jul. 27, 2017

(51) Int. Cl.

| | |
|---|---|
| *G06K 9/34* | (2006.01) |
| *G06T 5/00* | (2006.01) |
| *G06T 15/20* | (2011.01) |
| *G06T 7/00* | (2017.01) |
| *G06K 9/62* | (2006.01) |
| *G06T 3/60* | (2006.01) |
| *G06T 3/20* | (2006.01) |

(Continued)

(52) U.S. Cl.
CPC .............. *G06T 5/00* (2013.01); *G06K 9/6267* (2013.01); *G06T 3/20* (2013.01); *G06T 3/60* (2013.01); *G06T 7/004* (2013.01); *G06T 7/0079* (2013.01); *G06T 7/20* (2013.01); *G06T 7/60* (2013.01); *G06T 15/20* (2013.01); *G06T 2200/04* (2013.01); *G06T 2207/20144* (2013.01)

(58) Field of Classification Search
CPC .... G06T 5/00; G06T 3/20; G06T 3/60; G06T 7/20; G06T 7/60; G06T 15/20; G06T 2200/04; G06K 9/6267
See application file for complete search history.

(56) References Cited

U.S. PATENT DOCUMENTS

| | | | |
|---|---|---|---|
| 5,930,379 | A | 7/1999 | Rowley et al. |
| 5,982,389 | A | 11/1999 | Guenter et al. |

(Continued)

OTHER PUBLICATIONS

Agarwal et al., "Recovering 3d human pose from monocular images", IEEE Trans. Pattern Anal. Mach. Intell., 28(1), 2006, 44-58.

(Continued)

*Primary Examiner* — Phuoc Tran
(74) *Attorney, Agent, or Firm* — Kilpatrick Townsend & Stockton LLP

(57) ABSTRACT

Systems and method for the reconstruction of an articulated object are disclosed herein, The articulated object can be reconstructed from image data collected by a moving camera over a period of time. A plurality of 2D feature points can be identified within the image data. These 2D feature points can be converted into three-dimensional space, which converted points are identified as 3D feature points. These 3D feature points can be used to identify one or several rigidity constrains and/or kinematic constraints. These rigidity and/or kinematic constraints can be applied to a model of the reconstructed articulated object.

22 Claims, 10 Drawing Sheets

(51) Int. Cl.
*G06T 7/60* (2017.01)
*G06T 7/20* (2017.01)

(56) References Cited

U.S. PATENT DOCUMENTS

| | | | |
|---|---|---|---|
| 6,115,052 | A | 9/2000 | Freeman et al. |
| 6,240,198 | B1 | 5/2001 | Rehg et al. |
| 6,795,567 | B1 | 9/2004 | Rehg et al. |
| 6,873,724 | B2 | 3/2005 | Brand |
| 7,859,540 | B2 | 12/2010 | Dariush |
| 8,023,726 | B2 | 9/2011 | Sundaresan et al. |
| 8,073,196 | B2 | 12/2011 | Cohen et al. |
| 8,207,963 | B2 | 6/2012 | Perlman et al. |
| 8,712,146 | B2 | 4/2014 | Kim et al. |
| 8,861,785 | B2 | 10/2014 | Fukuchi et al. |
| 2006/0028476 | A1 | 2/2006 | Sobel et al. |
| 2006/0139355 | A1 | 6/2006 | Tak et al. |
| 2012/0062702 | A1* | 3/2012 | Jiang ............... G06T 7/0044 348/46 |
| 2013/0155058 | A1* | 6/2013 | Golparvar-Fard .... G06T 19/006 345/419 |
| 2015/0317821 | A1* | 11/2015 | Ding .................... G06T 7/00 345/420 |

OTHER PUBLICATIONS

Agarwal et al., "Building rome in a day", Commun. ACM, 54(10), 2011, 105-111.
Agarwal et al., "Ceres solver", http://ceres-solver.org [Onlin; accessed Jan. 14, 2016].
Akhter et al., "Nonrigid structure from motion in trajectory space", In NIPS, 2008, 41-48.
Avidan et al., "Trajectory triangulation: 3D reconstruction of moving points from a monocular image sequence", IEEE Transactions on Pattern Analysis and Machine Intelligence 22(4), 2000, 348-357.
Balan et al., "An adaptive appearance model approach for model-based articulated object tracking", Computer Vision and Pattern Recognition, 2006 IEEE Computer Society Conference on. vol. 1. IEEE, 2006.
Blanz et al., "A morphable model for the synthesis of 3d faces", In SIGGRAPH, 1999, 187-194.
Brand, "Morphable 3D models from video", Computer Vision and Pattern Recognition, 2001. CVPR 2001. Proceedings of the 2001 IEEE Computer Society Conference on. vol. 2. IEEE, 2001.
Bregler et al., "Recovering non-rigid 3D shape from image streams", Computer Vision and Pattern Recognition, 2000. Proceedings. IEEE Conference on. vol. 2. IEEE, 2000.
Dai et al., "A simple prior-free method for nonrigid structure-from-motion factorization", Proceedings of the 2012 IEEE Conference on Computer Vision and Pattern Recognition (CVPR). IEEE Computer Society, 2012.
Del Bue, "A factorization approach to structure from motion with shape priors", Computer Vision and Pattern Recognition, 2008. CVPR 2008. IEEE Conference on. IEEE, 2008.
Del Bue et al., "Non-rigid structure from motion using ranklet-based tracking and non-linear optimization", Image and Vision Computing 25.3, 2007, 297-310.
Fayad et al., "Automated articulated structure and 3d shape recovery from point correspondences", Computer Vision (ICCV), 2011 IEEE International Conference on. IEEE, 2011, 431-438.
Fossati et al., "From canonical poses to 3D motion capture using a single camera", IEEE transactions on pattern analysis and machine intelligence 32(7), 2010, 1165-1181.

Gotardo et al., "Computing smooth time trajectories for camera and deformable shape in structure from motion with occlusion", IEEE Transactions on Pattern Analysis and Machine Intelligence 33(10), 2011, 2051-2065.
Hartley et al., "Perspective nonrigid shape and motion recovery", Computer Vision—ECCV 2008, 2008, 276-289.
Hornung et al., "Self-calibrating optical motion tracking for articulated bodies", Virtual Reality, 2005. Proceedings. VR 2005. IEEE, 2005.
Kaminski et al., "A general framework for trajectory triangulation", Journal of Mathematical Imaging and Vision 21(1-2), 2004, 27-41.
Kuffner et al., "Motion Planning for Humanoid Robots Under Obstacle and Dynamic Balance Constraints", In Proc. 2001 IEEE Int'l Conf. on Robotics and Automation (ICRA 2001), 2001.
Lee et al., "Posture Manifolds for Tracking: Modeling View and Posture Manifolds for Tracking", ICCV '07, 2007.
Paladini, "Optimal metric projections for deformable and articulated structure-from-motion", International Journal of Computer Vision 96(2), 2012, 252-276.
Paladini et al., "Factorization for non-rigid and articulated structure using metric projections", Computer Vision and Pattern Recognition, 2009. CVPR 2009. IEEE Conference on. IEEE, 2009.
Park et al., "3D reconstruction of a moving point from a series of 2D projections", Computer Vision—ECCV 2010, 2010, 158-171.
Park et al., "3D reconstruction of a smooth articulated trajectory from a monocular image sequence", Computer Vision (ICCV), 2011 IEEE International Conference on. IEEE, 2011.
Perriollat et al., "Monocular template-based reconstruction of inextensible surfaces", International journal of computer vision 95(2), 2011, 124-137.
Ross et al., "Learning articulated structure and motion", International Journal of Computer Vision, 88(2), 2010, 214-237.
Russell et al., "Video pop-up: Monocular 3d reconstruction of dynamic scenes", European conference on computer vision, 2014, 583-598.
Shashua et al., "Homography tensors: On algebraic entities that represent three views of static or moving planar points", Computer Vision-ECCV 2000, 2000, 507-521.
Shi et al., "Good features to track", Computer Vision and Pattern Recognition, 1994. Proceedings CVPR'94., 1994 IEEE Computer Society Conference on. IEEE, 1994, 593-600.
Tomasi et al., "Shape and motion from image streams under orthography: a factorization method", International Journal of Computer Vision 9(2), 1992, 137-154.
Torresani et al., "Nonrigid structure-from-motion: Estimating shape and motion with hierarchical priors", IEEE transactions on pattern analysis and machine intelligence 30(5), 2008, 878-892.
Tresadern et al., "Articulated structure from motion by factorization", Computer Vision and Pattern Recognition, 2005. CVPR 2005. IEEE Computer Society Conference on. vol. 2. IEEE, 2005.
Wu et al., "Action Recognition in Videos Acquired by a", ICCV '11, 2011.
Wu, VisualSFM : A Visual Structure from Motion System. http://ccwu.me/vsfm/. [Online; accessed Oct. 18, 2014].
Xiao et al., "A closed-form solution to non-rigid shape and motion recovery", International Journal of Computer Vision 67(2), 2006, 233-246.
Yan et al., "A factorization-based approach for articulated nonrigid shape, motion and kinematic chain recovery from video", IEEE Transactions on Pattern Analysis and Machine Intelligence 30(5), 2008, 865-877.
Zhou et al., "Recovering articulated motion with a hierarchical factorization method", International gesture workshop. Springer Berlin Heidelberg, 2003.

* cited by examiner

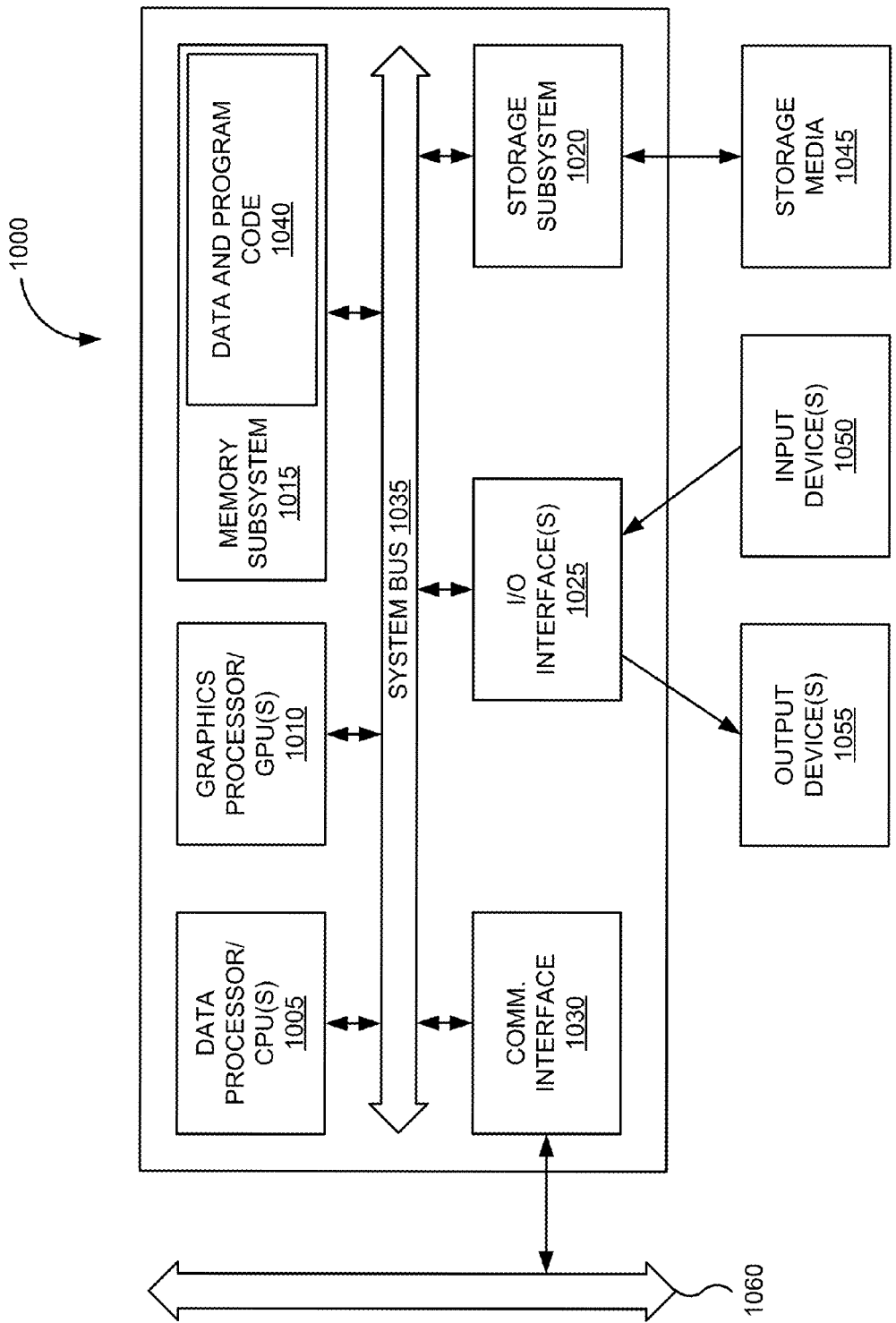

RECONSTRUCTION OF ARTICULATED OBJECTS FROM A MOVING CAMERA

BACKGROUND

The present disclosure generally relates to scene reconstruction, and more specifically to the virtual reconstruction of an articulated object within a scene.

Reconstructing a 3D scene from image sequences has been an important research question for several decades. In particular, structure from motion (SfM) techniques have been successfully used in a wide area of different applications such as localization, navigation, and image based modeling, up to reconstructing entire cities from unstructured image collections. However, these methods require the scene to be static.

Reconstructing deforming objects is a largely unsolved problem, but has a wide range of practical applications. Many deforming object, such as humans, animals and most human-made machines, move in an articulated way, or in other words, can be approximated by a set of piecewise rigid parts, connected by joints. Because of this articulated movement of humans, animals and most human-made machines there is significant interest in the task of articulated structure from motion (A-SfM).

One general solution to A-SfM is to use shape templates and deform them to match the observed images. This technique can be used when a shape template of the non-rigid object is available a priori, then a full 3D re-construction can be computed by deforming the template using motion priors to match the current observation. However, this method use detailed template and motion models and is not easily generalized.

A more generic approach is to track 2D points over a video, segment them into articulated parts and apply factorization methods. In order to segment the input trajectories, these methods generally minimize some energy function, usually exploiting point connectivity in 2D and modeling the object shapes in 2.5D or 3D.

Each of these, and other methods, has shortcomings which limit the usability of these techniques. Therefore, it is desirable to provide new systems and methods for automatically addressing such problems associated the reconstruction of an articulated object.

BRIEF SUMMARY

Embodiments can provide systems and method for the virtual reconstruction of an articulated object from data identifying the location of a plurality of points. In some such methods, image data, including data relevant to the articulated object, can be captured by a camera in a sequenced series of images. A 2D track can be generated from the image data and can be used to generate a plurality of 3D points. One or several rigid members and/or joints can be identified from these 3D points, and one or both of a rigidity constraint and a kinematic constraint to create a model of the articulated object.

BRIEF DESCRIPTION OF THE DRAWINGS

FIG. 11 is a block diagram of a computer system or information processing device that may incorporate an embodiment, be incorporated into an embodiment, or be used to practice any of the innovations, embodiments, and/or examples found within this disclosure.

DEFINITIONS

Figure 1:
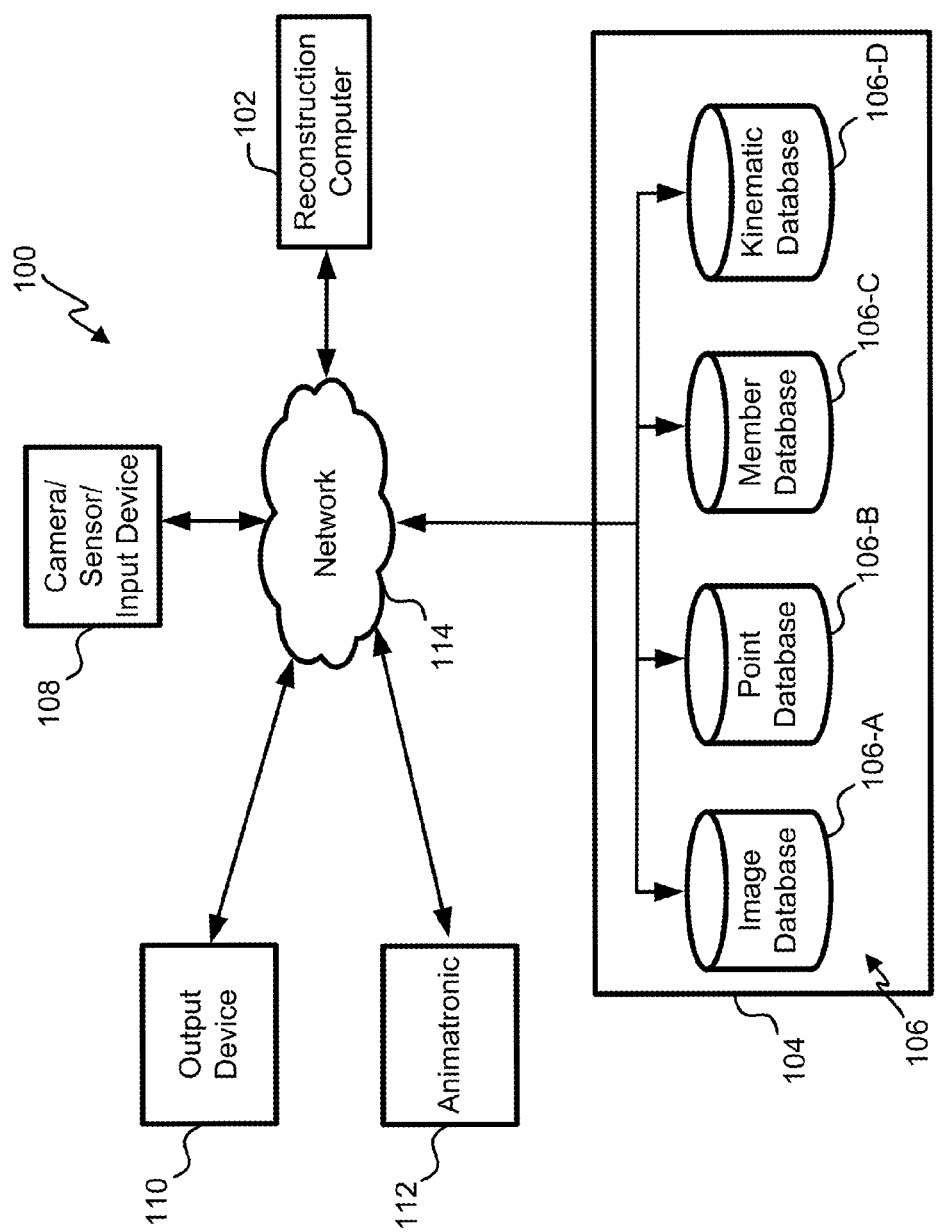
FIG. 1 is a schematic illustration of one embodiment of a system for the virtual reconstruction of an articulated object.

As used herein, an "articulated object" is any object that includes two or more rigid members that are moveably connected by a joint. The articulated object can be a living object, such as a human or an animal, or a non-living object such as a backhoe or a crane. As used herein, a "rigid member" is any member that moves as a unit, does not move with respect to itself, and/or maintains a constant size or shape.

As used herein, a "camera" is any device capable of capturing image data. The image data can be captured in the form of a video or video stream, or as a sequenced series of still images. The image data can be digitally captured or captured via an imaging medium in analog format such as, for example, film. In embodiments in which image data is captured via an imaging medium, the imaging data can converted for use in a computer environment either by the conversion of the analog image data to digital image data, or via the generation of digital point data from the analog image data.

As used herein, "image data" is electronic data for plural images taken over a period of time. Image data can be collected by one or several cameras, or can be generated from a plurality of images, also referred to herein as frames, captured via an imaging medium. The images forming the image data can be of the same object, the same objects, or of the same scene. Alternatively, the images of the sequenced series of images can be of different objects or of different scenes. In some embodiments, the images forming the image data can be sequenced, and in particular can be temporally sequenced to be in the order, or in the reverse-order in which the images were captured. As used herein, temporally sequenced images are referred to as a "sequenced series of images." The sequenced series of images forming the image data are mathematically represented herein as: $I=\{I_1, \ldots, I_F\}$, wherein I represents the sequenced series of images and each of $I_1, \ldots, I_F$ refer to one of the images forming the sequenced series of images. As used in herein, f, wherein $f \in \{1, \ldots, F\}$, is an integer value index, where F is the number of frames in the sequenced series of images. As such, f identifies one of the images from the sequenced series of images.

As used herein a "feature point" refers to a location on the articulated object. The articulated object can include a plurality of feature points, the number and position of which can be selected according to known methods to define the articulated object. The feature points of the articulated object can be identified in the image data and can be tracked throughout the sequenced series of images. The tracked feature points, which are tracked in two-dimensional image space, are referred to herein as 2D feature points or alternatively as 2D points. A set of 2D feature points are mathematically represented herein as $W = \cup W_f^t$, wherein W is the union of all sets of 2D feature points. W identifies the 2D feature points based on their associated feature point and their associated image in the sequenced series of images. Specifically W is a set of 2D feature points tracked over $I_f$, where $f \in \{1, \ldots, F\}$ and $t \in \{1, \ldots, T\}$, and T is the number of feature points. Accordingly, $W_f^t$ at a selected f value and at a selected t value identifies a 2D feature point at one feature point and in one image of the sequenced series of images.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

I. Introduction

The reconstruction of an articulated object from image data is difficult, and currently used techniques have several limitations which prevent the broader use of these reconstructions and limit the accuracy of these reconstructions. The present disclosure provides new methods of reconstructing an articulated object without any prior intelligence relating to the object such as, for example, the size and location of rigid members and/or joints in the object. As such, the presently disclosed methods are able to generate reconstructions of greater accuracy under more diverse circumstances.

In these methods, point data can be gathered from an articulated object and can be used to virtually reconstruct the articulated object. This reconstructed articulated object and/or movements of the reconstructed articulated object can form the foundation for the generation of animation or for the controlling of one or several animatronics.

The point data can be gathered in many ways including via one or several cameras, sensors including, for example, infra-red, depth sensors, LIDAR sensors, marker based motion capture, or the like. In some embodiments, the one or several cameras can generate image data that can be a sequenced series of images. These images can capture data from different perspectives and at different times. In one particular embodiment, the sequenced series of images can be captured by a single, moving camera. 2D feature points can be identified in the 2D data, and then converted into 3D points to create a 3D point cloud representation of the articulated object. This representation of the articulated object can be refined and improved by the generation and application of at least one rigid member constraint and/or at least one kinematic constraint.

II. System

With reference now to FIG. 1 a schematic illustration of one embodiment of a system 100 for the virtual reconstruction of an articulated object is shown. The system 100 can include a reconstruction computer 102. The reconstruction computer 102 can be any computing and/or processing device including, for example, one or several laptops, personal computers, tablets, smartphones, servers, mainframe computers, processors, or the like. The reconstruction computer 102 can be configured to receive inputs from one or several other components of the system 100, to process the inputs according to one or several stored instructions, and to provide outputs to control the operation of one or several of the other components of the system 100.

The system 100 can include memory 104. The memory 104 can represent one or more storage media and/or memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. The memory 104 can be an integral part of the reconstruction computer 102 and/or can be separate from the reconstruction computer 102. In embodiments in which the memory 104 is separate from the reconstruction computer 102, the memory 104 and the reconstruction computer 102 can be communicatingly linked via, for example, communications network 114.

The memory 104 can include software code and/or instructions for directing the operation of the reconstruction computer 102 and/or one or several databases 106 containing information used by the reconstruction computer 102 and/or generated by the reconstruction computer 102. These databases include, for example, an image database 106-A, a point database 106-B, a member database 106-C, and a kinematic database 106-D.

The image database 106-A stores image data. This image data includes one or several independent images, and/or one or several images that together form a sequenced series of images. The data stored within the image database 106-A can be received either directly or indirectly from the camera/sensor/input device 108, also referred to herein as the camera 108.

The point database 106-B stores information identifying one or several points. This information can specify the two dimension location of one or several two-dimensional ("2D") points within one or several images, and/or can specify the three-dimensional location of one or several 3D points within the scene of which the image data was generated. The point information can be received from the camera 108 and/or from the reconstructions computer 102.

The member database 106-C stores rigid member data relating to one or several rigid members. This rigid member data is generated from the point data by the reconstruction computer 102. The rigid member data can identify one or several rigid members, the one or several 2D or 3D points belonging to that rigid member, information specifying and/or identifying movements of that rigid member, or the like.

The kinematic database 106-D stores kinematic data and/or joint data identifying one or several joints linking one or several of the rigid members. In some embodiments, these joints define the interconnectivity of one or several of the rigid members. Thus, these joints can define, for example, where one or several rigid members are connected, and how those one or several rigid members are connected and/or are moveable with respect to each other. This joint data is generated from the point data by the reconstruction computer 102.

Camera 108, which can include one or several sensors or input devices, can be any device that can generate image data, receive image data, and/or can generate or receive 2D or 3D point data. In some embodiments, the camera 108 can be a camera including a video camera, a scanner, one or several position tracking sensors, or the like.

Output device 110 can be any device that can provide a perceivable output to one or several users. Output device 110 can be implemented by one or several speakers, screens, monitors, televisions, laptops, personal computers, tablets, smartphones, or the like. In some embodiments, the output device 110 can be configured to transform one or several electrical signals received from the reconstruction computer 102 into a visual output such as, for example, a display on a one or several screens, monitors, televisions, or the like.

The system 100 can include one or several animatronics 112. The one or several animatronics 112 can be one or several robotic devices that emulate a human or an animal, or bring lifelike characteristics to an otherwise inanimate object. The one or several animatronics 112 can be controlled and/or controllable via one or several electrical signals received and/or receivable from the reconstruction computer 102.

The system 100 can be communication enabled such that components in the system can send data to other components inside of or outside of the system 100, and/or receive data from components inside or outside of the system 100. In some embodiments, this communication enabling can be via one or several hardwired connection via, one or several wires, cables including optical fiber cables, buses, or the like, and in some embodiments, this communication enabling can be via one or several wireless connections. These wireless connections can include one or several local area networks (LAN), one or several wireless mesh networks, one or several cellular networks, one or several telecommunication networks, or the like. The communication enablement is shown in FIG. 1 as network 114, also referred to herein as communication network 114. Although only a single network 114 is identified in FIG. 1, the system 100 may include any number of different communication networks between any of the computer servers and devices shown in FIG. 1 and/or other devices described herein. The networks 114 may enable communication between the various computing devices, servers, and other components of the system 100.

III. Articulated Object

Figure 2:
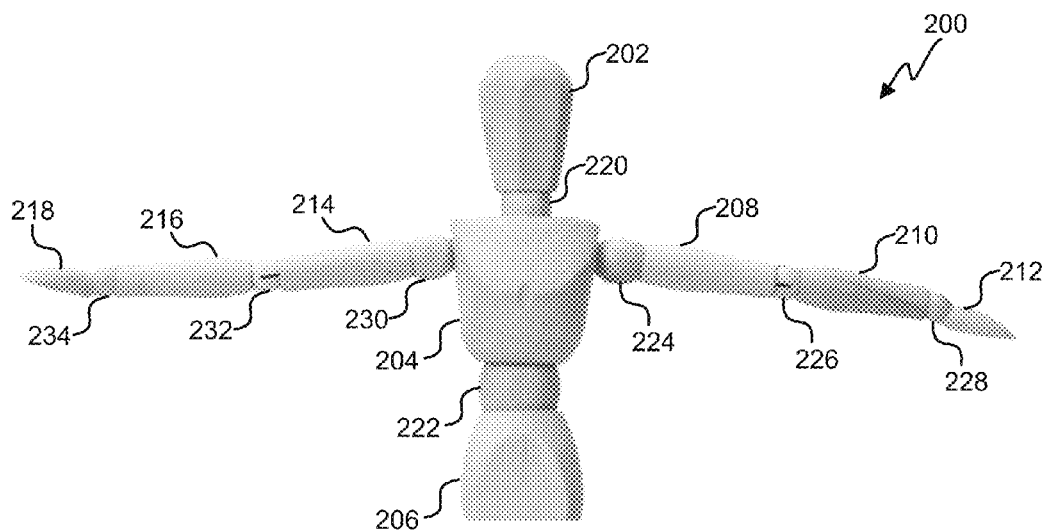
FIG. 2 is a perspective view of one embodiment of an exemplary articulated object in a first position.
Figure 3:
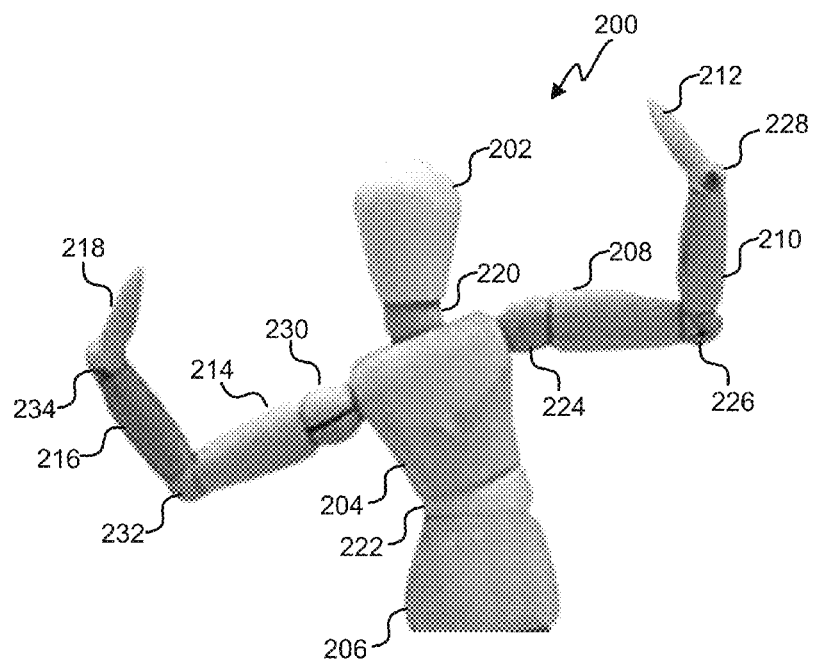
FIG. 3 is a perspective view of one embodiment of an exemplary articulated object in a second position.

With reference now to FIGS. 2 and 3, perspective view of an embodiment of an articulated object 200 is shown in a first position (FIG. 2) and in a second position (FIG. 3). The articulated object includes a plurality of rigid members 202-218 connected to one another via a plurality of joints 220-234. The connection of the rigid members 202-218 via joints 220-234 allows the movement of the rigid members 202-218 with respect to each other. Specifically, as seen in FIG. 2, rigid members 208-212 and 214-218 are arranged in an approximately linear manner, while the same rigid members 208-212 and 214-218 in FIG. 3 are in a non-linear position. As further seen in FIGS. 2 and 3, while the position of the rigid members 202-218 with respect to each other is different in FIG. 3 than in FIG. 2, the rigid members 202-218 each moved as a unit, did not move with respect to themselves, and maintained a constant size and shape.

IV. Simplified Reconstruction of a Virtual Articulated Object

Figure 4:
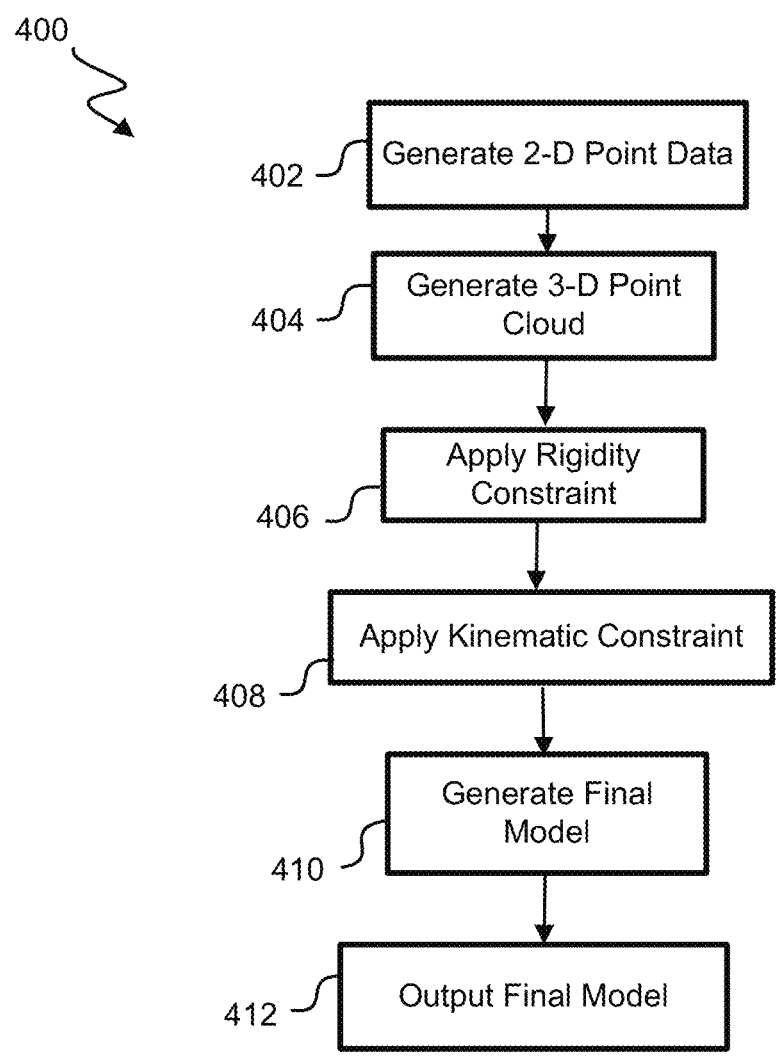
FIG. 4 is a flowchart illustrating one embodiment of a high-level process for the virtual reconstruction of an articulated object.

With reference now to FIG. 4, a flowchart illustrating one embodiment of a process 400 for the virtual reconstruction of an articulated object is shown. This process 400 can be used in converting motions, movements, and/or properties of the articulated object to: control the movement of one or several machines including one or several animatronics, one or several industrial robots, or the like; control or generate one or several gestures, and/or to control and/or generate one or several animations, crowd models, or the like.

The process 400 begins at block 402 wherein 2D point data is generated according to known structure from motion (SfM) algorithms or other algorithms capable of generating 2D point data from image data. The 2D point data can be generated by the camera/sensor/input device 108 and/or based off of image data generated by the camera/sensor/input device 108, received at the reconstruction computer 102, and stored in the memory 104, and particularly in the point database 106-B of the memory 104.

The 2D point data identifies a plurality of locations on the articulated object with a plurality of points. This identification can include uniquely associating one or several points with each of the plurality of locations. The 2D point data can be collected for some or all of the plurality of points over a period of time at a plurality of instances in time. These instances in time can be regularly spaced or irregularly spaced. Thus, this data identifies the position of at least some of the plurality of points at the plurality of instances in time over the period of time. In one embodiment, the 2D point data is organized into a plurality of sets of data based on the instance in time at which the 2D point data was collected.

In step 404 a three-dimensional ("3D") point cloud is created by converting some or all of the 2D points in the 2D point data to 3D points. The 3D points making up the 3D point cloud, like the 2D point data, can be organized into a plurality of sets of data based on the instance in time at which the 2D point data corresponding to the 3D point was collected.

This organization of the 3D point cloud results in the creation of a 3D representation, also referred to herein as a "3D model" or a "virtual model," of the articulated object at each of the instances in time at which 2D point data was collected. However, as the generation of the 3D point cloud from the 2D points can include errors, the 3D representation can, if desired, be refined according to the steps of blocks 406 to 410.

If additional refinement of the 3D model is desired, then the process 400 proceeds to block 406, wherein one or several rigidity constraints are generated and applied to the 3D point cloud. These rigidity constraints can identify one or several of the groups of 3D points in the 3D point cloud as belonging to one or several rigid members. Once grouped, the shape and movements of these rigid members can be identified and used to refine the 3D model so that the 3D model more closely matches the shape, structure, and/or motion of the articulated object.

The rigidity constraints can be generated and/or applied by the reconstruction computer 102, and information relating to the rigidity constraints can be stored in the member database 106-C of the memory 104. Further, these rigidity constraints can be generated without prior knowledge regarding the rigid members and/or joints of the articulated object.

After the rigidity constraints have been generated and applied, the process 400 proceeds to block 408, wherein one or several kinematic constraints are generated and/or applied. The kinematic constraints can identify one or several joints connecting two or more of the rigid members. This identification of the joints can include, for example, an identification of the location on the two or more rigid members at which the joint connects the two or more rigid members, the type of connection and/or degrees of freedom of the joint, or the like. Once one or several joints have been identified, these joints can be used to restrict movement of the two or more rigid members connected by the joints, and used to refine the 3D model so that the 3D model more closely matches the shape, structure, and/or motion of the articulated object.

The kinematic constraints can be generated and/or applied by the reconstruction computer 102, and information identifying the kinematic constraints can be stored in the kinematic database 106-D of the memory 104. Further, these kinematic constraints can be generated without prior knowledge regarding the rigid members and/or joints of the articulated object.

At block 410 a final model is generated. This final model can be the organized 3D point cloud generated after the application of the rigidity and kinematic constraints. This model can be generated by the reconstruction computer 102 and can be stored in the memory 104, and particularly in the point database 104-B.

In block 412, wherein the final model is output. In some embodiments, the outputting of the final model can include providing the final model to the output device 110. The output device 110 can display the final model and/or animation based on the final model to one or several users. In some embodiments, the output can be used to control the movement of the one or several animatronics.

V. Reconstruction of a Virtual Articulated Object

This section relates to the reconstruction of the virtual articulated object through the use of image data, and particularly via the use of a sequenced series of images. The steps discussed herein can be performed by the reconstruction computer 102.

a. Method of Reconstruction

Figure 5:
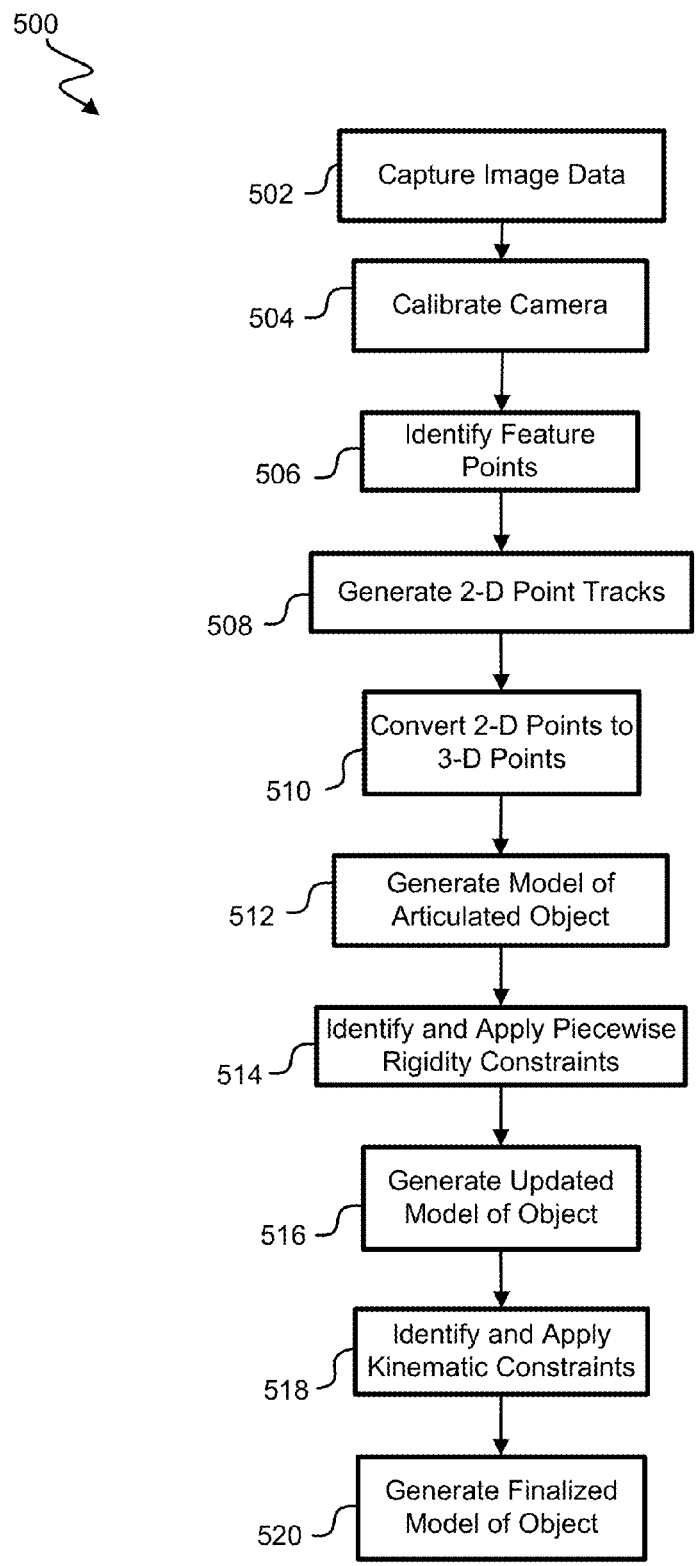
FIG. 5 is a flowchart illustrating one embodiment of a process for the virtual reconstruction of an articulated object using image data.

With reference now to FIG. 5, a flowchart illustrating one embodiment of a process 500 for the virtual reconstruction of an articulated object using image data is shown. The process 500 begins at block 502 wherein image data is captured. This image data can be captured by the camera 108, and the image data can include a sequenced series of images. In some embodiments, the camera 108 can be moving while capturing the image data so as to capture images with different perspectives. Alternatively, the camera 108 can comprise a plurality and/or an array of cameras arranged and controlled so as to generate image data similar to image data generated by a moving camera 108.

The sequenced series of images can be temporally sequenced and can be generated over a desired time frame. Further, the image data can depict all or portions of the articulated object in some or all of the images forming the image data. The captured image data can be stored in the memory 104, and specifically can be stored in the image database 106-A of the memory.

In operation 504 the camera 108 is calibrated to determine information about the camera such as 3D position and/or orientation of the camera 108 and specifically of the lens of the camera for the images forming the image data. This calibration can be performed by the reconstruction computer 102 using information from the image data. Specifically, the calibration can be performed using portions of the image data relating to one or several fixed and/or static items in the images forming the image data using structure from motion techniques to self-calibrate camera 108. Other calibration techniques including using image-based as well as instrumented measurement of the camera parameters may be used as available in a particular application.

The calibration of the camera generates position data for the camera and/or for the camera lens, and specifically generates data representing a camera point at which the optical center of the lens of the camera is located in each of the images of the sequenced series of image. This camera point can be identified for some or all of the images of the sequenced series of images. This camera point can be defined by 3D location data, which can be, for example, three location coordinates of the camera point and is represented herein using the term $C_f$.

Data identifying the position and/or orientation of the camera 108 and/or lens of the camera for the images forming the image data can be stored in the memory 104, and can be specifically stored in the image database 106-A. Specifically, this position and/or orientation information can be used to generate a calibration matrix $P_f$.

At operation 506 one or several locations on the articulated object are designated as feature point(s) denoted $W_f$. Each image in the set of images $I=\{I_1, \ldots I_F\}$ will have one or more feature points $W_f$. The identification of a feature point $W_f$ can be according to a detected property of the articulated object such as, for example, an edge, a slope, a change in slope, a gradient, a change in gradient, a color, a change in color, or the like. In some embodiments, the identification of these one or several locations can be according to the application of a grid such as, for example, a mesh grid to the articulated object, and in some embodiments, these locations can be randomly selected and/or selected to provide a desired density of feature points on the articulated object. The feature points can be identified by the reconstruction computer 102, and can be stored in the memory 104, and particularly in the point database 106-B.

In operation 508 a plurality of 2D point tracks, also referred to herein as 2D tracks, are generated. A 2D track is a collection of 2D feature points gathered from some or all of the images of the sequenced series of images and relating to a single common feature point. Accordingly, a 2D track is mathematically represented by the term $W^t$. As used in herein, t, wherein $t \in \{1, \ldots, T\}$, is an integer value index, where T is the number of point tracks in the sequenced series of images. As such, t identifies one of the point tracks from the sequenced series of images. The 2D tracks can, in some embodiments, be stored within the point database 106-B of memory 104.

In operation 510 some or all of the points of the 2D points are converted to 3D points, and more specifically are converted from being defined by two-dimensional location information to being defined by three-dimensional location information. Like the 2D points, in some embodiments, each 3D point comprises a set of 3D sub-points, each of which 3D sub-points can identify the 3D location of a portion of the articulated object in one of the images forming the image data.

The conversion of the 2D points to 3D points can be performed using, for example, information gained through the camera calibration, the 2D points, and the 2D tracks. The conversion of the 2D points to 3D points results in the creation of a 3D point cloud. The 3D point cloud can represent the articulated object over all frames is denoted as $S = \cup S_f^t$, with each 3D point $S_f^t$ corresponding to a 2D point $W_f^t$. This conversion can be performed by the reconstruction computer 102, and the results of the conversion can be stored in the point database 106-B of the memory.

A model of the articulated object is generated in operation 512. The generation of this model can comprise the grouping of 3D points such that the 3D points associated with each of some or all of the images of the image data are grouped together. Each of these groups of data associated with one of the images of the image data forms a model of the articulated object in the position indicated in the image associated that group of data.

In operation 514, one or several rigidity constraints are identified and applied to the 3D points. In some embodiments, these one or several rigidity constraints can identify one or several members forming the articulated object, and can specifically identify one or several of the 3D points that together form/define a rigid member. The one or several rigidity constraints can be applied to the 3D points by grouping each of some or all of the 3D points with one of the one or several members forming the articulated object.

In operation 516 an updated model of the articulated object is generated. This updated model is generated from the identified one or several members forming the articulated object, and specifically by the combination of the one or several members forming the articulated object.

In 518 one or several kinematic constraints are identified and applied. In some embodiments, these one or several kinematic constraints can identify one or several joints linking one or several of the rigid members forming the articulated object. The one or several kinematic constraints can be applied to the rigid members by linking some or all of the rigid members to each other.

After the kinematic constraints have been identified and applied, the process 500 proceeds to block 520, wherein finalized model of the articulated object is generated. This finalized model is generated from the linked one or several rigid members forming the articulated object. This finalization of the model can be performed by the reconstruction computer 102.

b. Converting 2D Feature Points to 3D Feature Points

Figure 6:
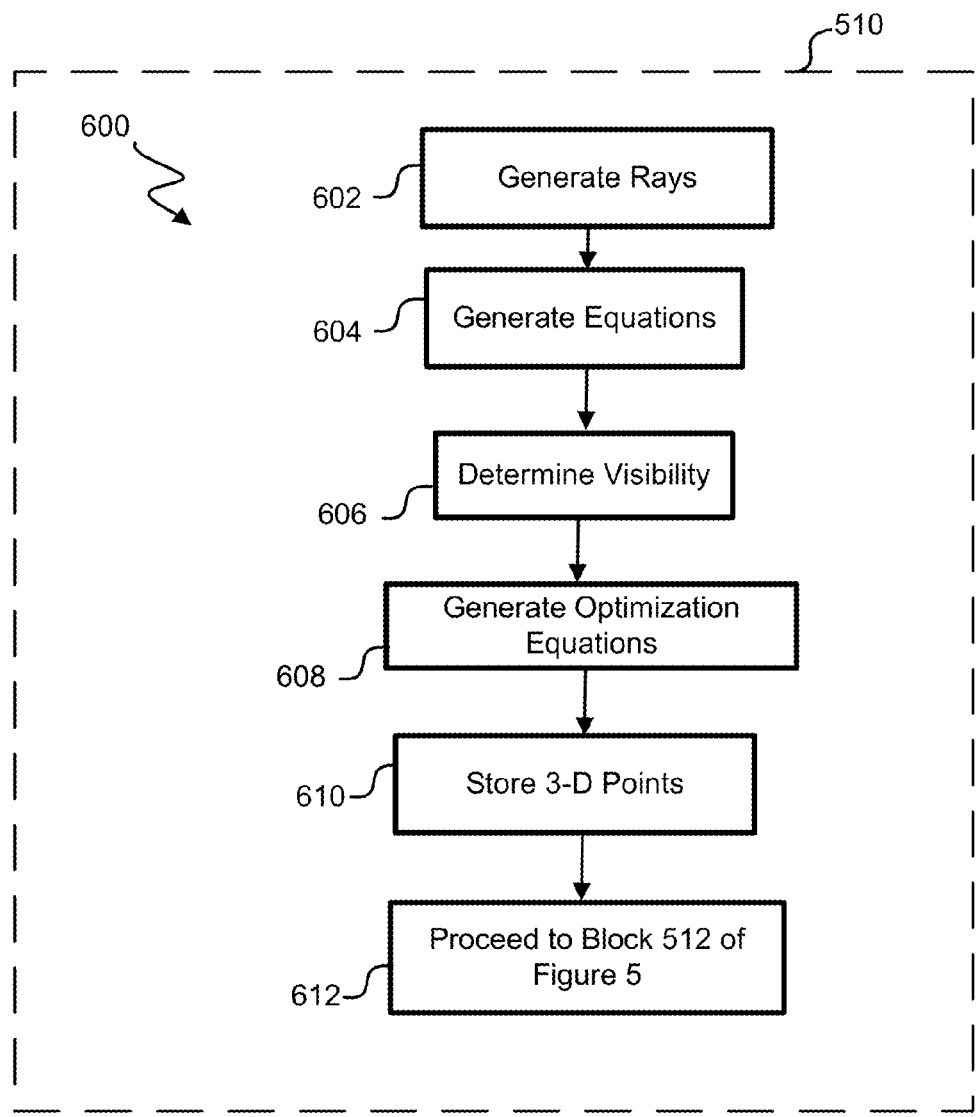
FIG. 6 is a flowchart illustrating one embodiment of a process for converting 2D points to 3D points.

FIG. 6 is a flowchart illustrating one embodiment of a process 600 for converting 2D points to 3D points. This process 600 can be performed separate from the process 500 of FIG. 5, or in some embodiments, the process 600 can be performed as a part of the process 500 of FIG. 5. In such an embodiment, the process 600 can be performed in the place or, or as a part of block 510 of FIG. 5.

At block 602 a plurality of rays are generated. Each ray is a line extending through the location of the camera determined in block 504 of FIG. 5 and through one of the 2D feature points. Operation 602 is performed on an image by image basis until rays have been generated for some or all of the images of the series of images I, or the generation of the plurality of rays can be performed for 2D tracks until rays have been generated for some or all of the 2D tracks.

In embodiments in which rays are generated on an image-by-image basis, the generation of rays can include retrieving camera points identifying the location of the center of the lens of the camera from one or more of the calibration matrices $P_f$.

The generation of rays can further include selecting the image from the sequenced set of images corresponding to the image for which calibration information was selected, and retrieving data for the 2D feature points of that selected image. The rays can then be generated so that each generated ray extends through the camera point for the selected image and through one of the 2D feature points of the selected image. This generation of rays can be repeated until a ray has been generated for some or all of the 2D feature points of the selected image. These rays can be mathematically defined by $C_f$, $W_f^t$, and $D_f^t$, wherein $D_f^t$ is the direction vector that goes from $C^f$ through $W_f^t$. These rays can be generated by the reconstruction computer 102, and data describing the generated rays can be stored in the memory 104, and particularly in the point database 106-B.

At operation 604 equations defining the 3D feature points corresponding to the 2D feature points are generated resulting in the generation of a system of equations. These 3D feature points are points identifying a three-dimensional location calculated from the 2D feature points. The 3D feature points are denoted as $S_f^t$. These 3D feature points can be arranged in 3D tracks denoted $S^t$ in the same fashion that 2D feature points can be arranged in 2D tracks denoted by $W^t$. Further, these 3D feature points, $S_f^t$, will lie on a line defined by the equation:

$$S_f^t = C_f + \mu_f^t D_f^t \qquad (1)$$

In equation (1), DJ is the direction vector that goes from $C^f$ through $W_f^t$, and $\mu_f^t$ parameterizes the equation to allow identification of $S_f^t$. In some embodiments, such equations can be generated for some or all of the rays generated in block 602.

At 606 the visibility of the feature points is determined. Depending on the position of camera 108 and the object as well as other object in a frame, particular feature points may be occluded or otherwise not visible to the camera 108. When a feature point is occluded it is tagged to indicate that it is not visible using a visibility variable $V_f^t$, which typically takes binary values such as 1 if a track t is visible on frame f and which can equal 0 if a track t is not visible on frame f.

Optimization equations are generated in 608 and the location of the 3D feature points are determined via optimization. This optimization can be performed by the reconstruction computer 102, and the results of the optimization can be stored in the memory, and can be specifically stored in the point database 106-B.

As all $S_f^t \in S^t$ for a 2D track $W^t$ will lie on a manifold described by the rays of that 2D track $W^t$. However, because there are multiple valid 3D paths that project to the same point track $W^t$ the equations for $S_f^t$ are underconstrained. But, because real world objects tend to move on smooth trajectories, a temporal coherence assumption can be used between 3D feature points of a 3D track in temporally adjacent frames. This assumption can allow identification of a point along each ray as the location of the 3D feature point by maximizing smoothness between the temporally adjacent points of a 3D track. This is mathematically accomplished by the equation:

$$E_{rs}(S^t) = \sum_{f=1}^{F-1} \|S_f^t - S_{f+1}^t\|^2. \qquad (2)$$

Substituting equation (1) into equation (2) results in the following function, which only depends on $\mu^t = \cup_{f=1}^{F} \mu_t^f$ $$E_{rs}(\mu^t) = \sum_{f=1}^{F-1} \|(C^f + \mu_f^t D_f^t) - (C_{f+1} + \mu_{f+1}^t D_{f+1}^t)\|^2 \qquad (3)$$

The energy equation (3) can be optimized for f where $V_f^t = 1$, i.e. for the frames where the track is visible for some or all tracks $W^t$.

In some embodiments, in applying the above equations, if a point is static, this energy function corresponds to standard triangulation. However, if a point is moving faster than the camera, this energy results in point trajectories which are close to camera centers. In order to alleviate this, weights $\omega_f^t$ are introduced that approximate the amount of motion for each tracked point. As the point and camera motion are intertwined, the distance from the epipolar line can be used as a means to approximate the point motion. To that end, the epipolar line corresponding to $W_f^t$ in $I_{f+1}$ can be computed and the distance $d_f^t$ between this line and $W_{f+1}^t$ can be measured. These distances can be normalized between 0.1 and 1, and $\omega_f^t$ of is then computed as the reciprocal of $d_f^t$. Thus, the energy function becomes:

$$E_{rs}(\mu^t) = \sum_{f=1}^{F-1} \omega_f^t \|(C_f + \mu_f^t D_f^t) - (C_{f+1} + \mu_{f+1}^t D_{f+1}^t)\|^2, \quad (4)$$

This formulation of the energy function now applies more weight to static parts of the point tracks, thereby keeping the dynamic trajectories in the proximity of the static points. While this estimate cannot detect movement along the epipolar axis, the soft nature of the weighting scheme improves the accuracy of the reconstructions created using this energy equation. Additionally, this energy equation is linear, and each point track is independent, making the energy equation very efficient to minimize. Moreover, the energy equation does not force the point tracks to lie on any motion subspace, and hence can describe a diverse set of possible movements. By using this optimization framework very efficient and robust models of 3D shape and motion of the objects can be achieved. The above equations can be used to calculate an energy based on the 3D tracks. These calculated energies can be minimized to calculate pt.

The locations of the 3D feature points are stored in operation 610. In some embodiments, this storage can include associating the locations of the 3D feature points with their corresponding image from which the 3D feature point was generated. These locations, and any image association information can be stored in the memory 104, and can be specifically stored in the point database 106-B. After the locations of the 3D feature points have been stored, the process 600 proceeds to block 612, and continues with block 512 of FIG. 5.

c. Generating and Applying Rigidity Constraints

Figure 7:
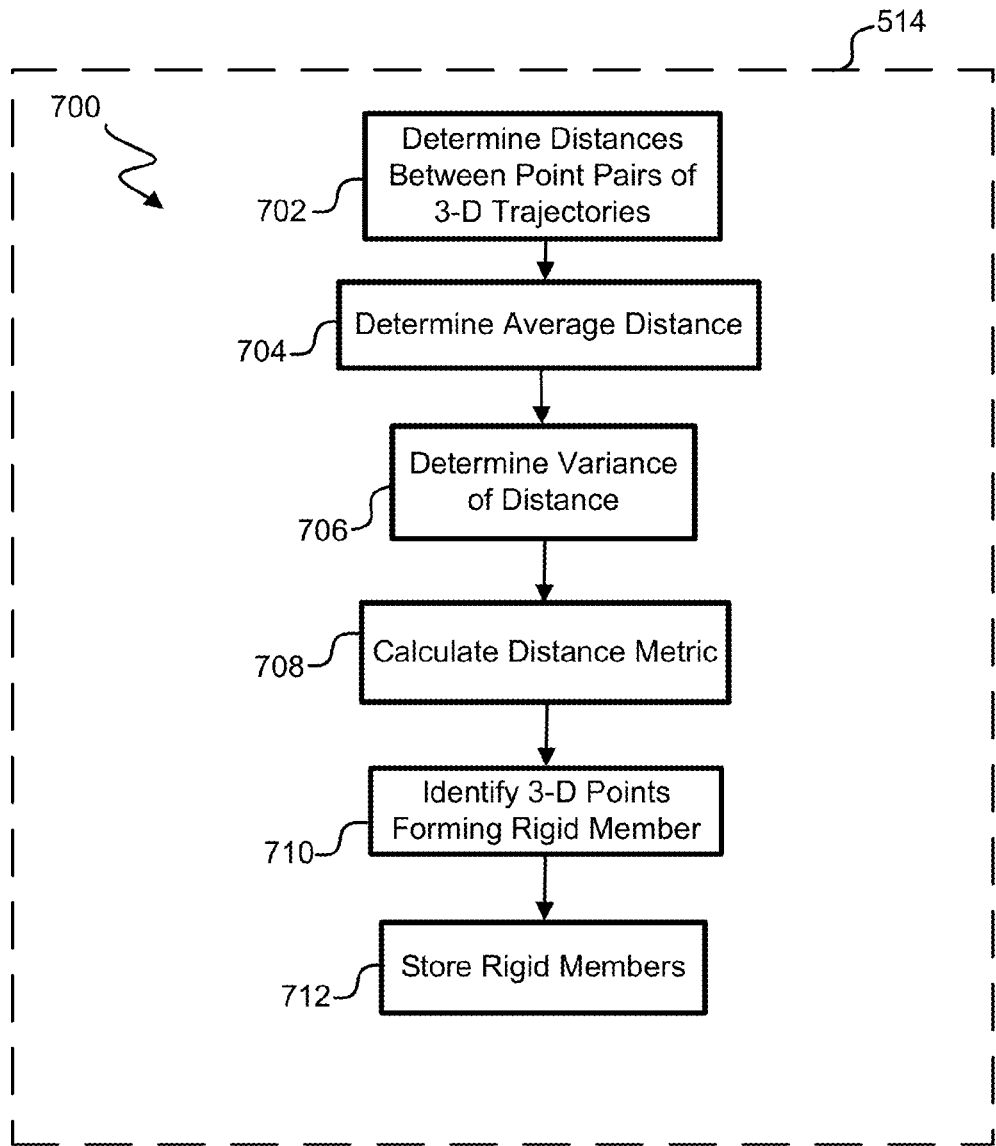
FIG. 7 is a flowchart illustrating one embodiment of a process for generating rigidity constraints.

FIG. 7 is a flowchart illustrating one embodiment of a process 700 for generating rigidity constraints. This process 700 can be performed separate from the process 500 of FIG. 5, or in some embodiments, the process 700 can be performed as a part of the process 500 of FIG. 5. In such an embodiment, the process 700 can be performed in the place or, or as a part of block 514 of FIG. 5.

Distances between the 3D tracks are determined at 702. This can include the retrieval of location information for the 3D feature points forming the 3D tracks from the memory 104, and particularly from the point database 106-B. The distance between a pair of 3D tracks can be determined by comparing the locations of the 3D feature points forming the 3D tracks, and specifically comparing the locations of 3D feature points from the pair of 3D tracks, which 3D feature points are in the same image. In some embodiments, this comparison can be made for some or all of the 3D feature points, and in one embodiment, this comparison can be made for all of the visible 3D feature points of a pair of 3D tracks. This comparison can be repeated until some or all of the 3D feature points of some or all of the 3D tracks have been compared, and the distances therebetween have been determined.

In process 704 the average distance between the pairs of 3D tracks is determined. This average distance is mathematically identified herein as d(t, t'). After the average distance between the pairs of 3D tracks has been determined the variance v(t, t') of the distance between the pairs of the 3D tracks is determined in process 706. Both the variance and the average of the distances between the pairs of 3D tracks can be calculated using known techniques by, for example, the reconstruction computer 102.

The distance metric is calculated in 708. In some embodiments, the distance metric is a weighted sum of the average distance between the 3D tracks and the variance of the distance between the pair of 3D tracks. The distance metric can be calculated per the following equation: e(t, t')=d(t, t')+av(t, t'), in which equation a is a weighting value, by, for example, the reconstruction computer 102. In some embodiments, the weighting value a can balance the effect of the average distance between point tracks and the variance between of the distance between pairs of 3D tracks and can prevent the improper coupling of 3D tracks.

In some embodiments, the weighting value a can be selected by the user based on, for example, the amount of noise in a data set. In some such embodiment, the weighting value a can, for example, be a value between: 0.001 and 0.04; 0.005 and 0.004; 0.01 and 0.1; or any other or intermediate range. In such embodiments, a smaller weighting value a can be selected as the noise in the data set increases and a larger weighting value a can be selected as the noise in the data set decreases.

At least one group of 3D tracks is identified as forming a rigid member in operation 710. This identification can be performed using the distance metrics, the average distances, and/or the variances calculated in step 706-710. The identification as at least one group of 3D tracks as forming a rigid member can be performed by the reconstruction computer 102.

In one embodiment a pair of 3D tracks is selected and the distance metric, average distance, and variance calculated for that pair of 3D tracks is retrieved. Further, a rigid member threshold value is identified and retrieved from the memory 104, which rigid member threshold value demarks between 3D tracks for grouping as belonging to the same rigid member and 3D tracks not for grouping as belonging to the same rigid member. At least one of: the distance metric, the average distance, and the variance calculated for that pair of 3D tracks is compared to the rigid member threshold, and a value indicative of whether, based on that comparison, the pair of 3D tracks belong to the same rigid member and identifying that rigid member is assigned to each of the pair of 3D tracks. This process can be repeated for some or all of the pairs of 3D tracks.

Alternatively, 3D tracks can be grouped into rigid members with a spectral clustering technique. In such an embodiment the distance metric is used to build a graph structure where nodes represent trajectories and edge weights are the affinities between trajectories. Affinities are computed from e(t, t') using a simple normal distribution function N(0, σ) with mean 0 and standard deviation σ is set to a desired value. In some embodiments, the standard deviation σ can be set to one-quarter the standard deviation of all distances, set to half the standard deviation of all distances, set to the standard deviation of all distances, or set to any other desired ratio or multiple of the standard deviation of all distances. In one embodiment, edges are added for the 20 closest neighbors for each node to have a compact graph for computational efficiency. A recursive two-way spectral clustering can then be applied on this graph, repeatedly subdividing all clusters into two parts until two criteria are reached: 1) all clusters have a lower number of trajectories than a threshold (T/k, where T is the number of tracks and k is the number of expected clusters) and 2) all clusters have a max(e(t, t')) lower than a threshold. If the spectral clustering results in clusters that are too small, these clusters that are too small can be attached to the closest cluster given the error metric. In some embodiments, the determination of whether the clusters are too small can be based on the dataset, and particularly based on the number of tracks. By way of example, in some embodiments, the clusters are too small when T/10, T/25, T/50, T/100, T/200, or any other or intermediate threshold.

In block 712, data describing the rigid members are stored. In some embodiments, data relating to the rigid members can be stored in the memory 104, and specifically in the member database 106-C. After information relating to the rigid members has been stored, the process 700 continues with the process 800 of FIG. 8.

Figure 8:
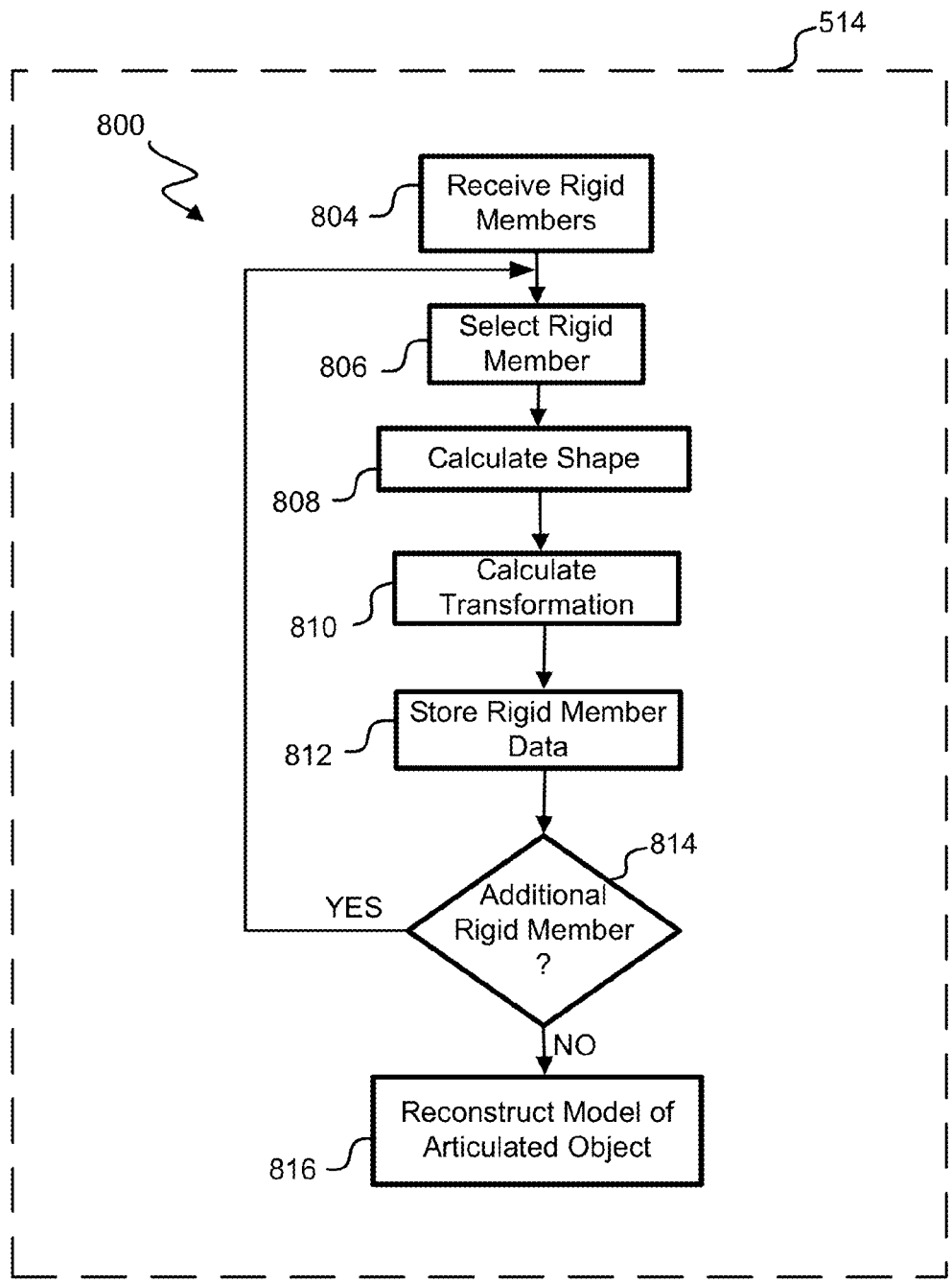
FIG. 8 is a flowchart illustrating one embodiment of a process for applying rigidity constraints.

FIG. 8 shows a flowchart illustrating one embodiment of a process 800 for applying the rigidity constraints. This process 800 can be performed separate from the process 500 of FIG. 5, or in some embodiments, the process 800 can be performed as a part of the process 500 of FIG. 5. Process 800 can be performed in the place or, or as a part of block 514 of FIG. 5.

The process 800 continues from process 700 at block 804, wherein the data representing groupings of 3D features forming the rigid members are received. In some embodiments, these can be received from the memory 104 and specifically from the member database 106-C. A rigid member is selected in operation 806.

In operation 808 a shape $\Omega^n$ of the selected rigid member is determined based on the location of the positions of the 3D features grouped to form the selected rigid member. The transformation of the rigid member is determined in operation 810. In some embodiments, the determination of the transformation of the rigid member includes determination of a rotation $R_f^n$ and/or a translation $T_f^n$ of the rigid member. The determination of the shape and/or the transformation of the rigid member can be made with data from the 3D tracks belonging to that rigid member, and particularly based on the visible 3D feature points in the images of the sequenced series of images. The determination of the shape and/or the transformation of the rigid member can be made by the reconstruction computer 102.

In operation 812 the rigid member data, and specifically, the shape and/or transformation of the rigid member is stored. In some embodiments, this data can be stored in the memory 104, and specifically in the member database 106-C. In decision operation 814 it is determined if there are any additional rigid members from those received in 804 that have not yet been selected in 806. If it is determined that the shape and/or transformation have not been calculated for all of the rigid members, then the process returns to block 806 to select a rigid member and perform operations 808-812 on the selected rigid member.

When the desired rigid members are processed the model of the articulated object is reconstructed in operation 816. The point cloud $S_f$ at each frame is described as a combination of rigid members, and is mathematically described as:

$$S_f = \bigcup_{n=1}^{N} R_f^n \Omega^n + T_f^n. \tag{5}$$

Thus, the aggregate of the three-dimensional shape, $\Omega^n$, and transformations $(R_f^n | T_f^n)$ of the rigid members form a model of the articulated object based on the identified rigid members.

This model can be refined by minimizing the difference between this model and the image data and/or the 2D feature points forming the image data. This refining can include the comparison of the rigid members and rigid member model to image data and to the 2D feature points forming the image data. This comparison is performed by the projection of the rigid members back to the images and/or back to 2D space. This projection can be performed using camera calibration data which can be stored in the one or several calibration matrices $P_f$. This comparison can be used to generate an error value, which error value can be minimized to improve the model of the articulated object. The minimization of the error value can be affected by a smoothness parameter which can eliminate and/or minimize the effect of noise in the image data.

Specifically, the three-dimensional shape $\Omega^n$ of the rigid members and the transformations $(R_f^n | T_f^n)$ of these rigid members can be altered and/or adjusted, such that when the 3D points $S_f$ are projected back to the images $I_f$, the error, referred to herein as the reprojection error, between the 3D points $S_f$ and the 2D feature points of images if is minimized. The minimization of the reprojection error can allow the identification of the best set of articulated rigid members to describe the motion of the 2D tracks observed in the frames. For the point tracks $W_f^t$ and their corresponding 3D position $S_f^t$, the following reprojection error is minimized:

$$\min_{S} \sum_{t=1}^{T} \sum_{f=1}^{F} \| W_f^t = P_f(S_f^t) \|^2 \tag{6}$$

Modifying this with Equation (5) and reordering the equations yields:

$$\min_{\Omega, R, T} \sum_{f=1}^{F} \sum_{n=1}^{N} \| W_f^n - P_f(R_f^n \Omega^n + T_f^n) \|^2 \tag{7}$$

In Equation (7), $W_f^n$ is the set of the 2D feature points corresponding to the 3D points in $\Omega^n$, or more formally, $W_f^n = \cup T_{t=1}^{T} W_f^t$ such that $S_f^t \in \Omega^n$.

These equations result in a non-linear optimization problem. This can be minimized, including with the CERES framework, also referred to as the ceres-solver. This optimization can be performed using 3D points that are visible in their associated image, or specifically for (t, f) with $V_f^t = 1$. In some embodiments, a temporal smoothness constraint, specifically temporal smoothness parameter $\lambda$, can be applied to force the rigid members to have coherent tracks in space:

$$\min_{\Omega, R, T} \sum_{f=1}^{F} \sum_{n=1}^{N} \| W_f^n - P_f(R_f^n \Omega^n + T_f^n) \|^2 + \lambda \tag{8}$$

$$\sum_{f=1}^{F} \sum_{n=1}^{N} \| (R_n^f \Omega^n + T_f^n) - (R_{f+1}^n \Omega^n + T_{f+1}^n) \|^2$$

This temporal smoothness parameter $\lambda$ can be used to decrease and/or eliminate noise within the model of the articulated object. In some embodiments, the temporal smoothness parameter $\lambda$ can be selected by the user based on, for example, the level of the noise in the data set. In some embodiments, the temporal smoothness parameter $\lambda$ can be a value between, for example, 0 and 100; 1 and 50; 2 and 25;

3 and 10; or any other or intermediate values. In such embodiments, a larger temporal smoothness parameter λ can be selected as the noise in the data set increases and a smaller temporal smoothness parameter λ can be selected as the noise in the data set decreases. In some embodiments, the temporal smoothness parameter λ can also depend on any scaling done to the image data. In such embodiments, the value of the temporal smoothness parameter as selected based on the level of noise in the data set is multiplied by the scaling factor with which the image data is being scaled.

This optimization can modify the three-dimensional shape, $\Omega^n$, and/or transformations ($R_f^n|T_f^n$) of one or several of the rigid members, which can likewise affect the model of the articulated object based on the identified rigid members.

After the model of the articulate member is generated and/or reconstructed, the process continues with block 516 of FIG. 5.

d. Generating and Applying Kinematic Constraints

Figure 9:
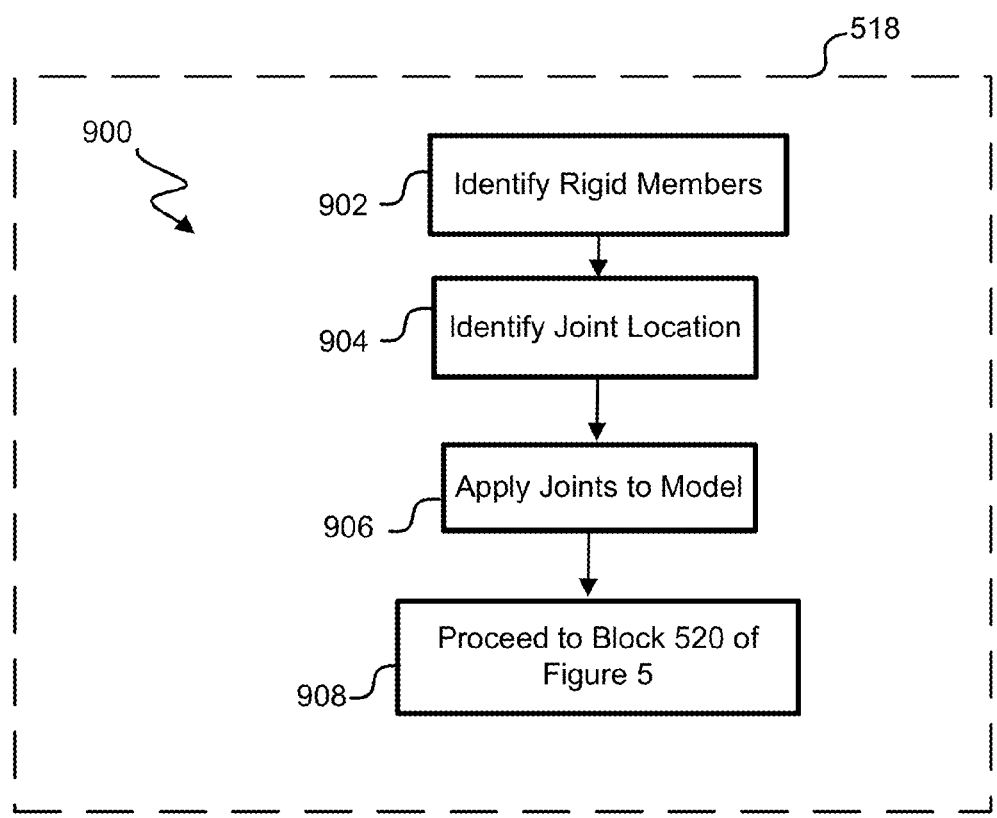
FIG. 9 is a flowchart illustrating one embodiment of a process for generating and applying a kinematic constraint.

FIG. 9 shows a flowchart illustrating one embodiment of a process 900 for generating and applying kinematic constraints. This process 900 can be performed separate from the process 500 of FIG. 5, or in some embodiments, the process 800 can be performed as a part of the process 500 of FIG. 5. In such an embodiment, the process 900 can be performed in the place or, or as a part of block 518 of FIG. 5.

In operation 902 connected rigid members are computed. Connected rigid members can be computed by determining the distances between pairs of rigid members in some or all of the frames of the sequenced series of images I. From these determined distances, the minimum distances separating the pair of rigid members can be computed, and the largest of the minimum distances separating the pair of rigid members can be computed. The maximum of the minimum distances can be compared to a threshold value, and a pair of rigid members can be determined as connected based on the result of the comparison of the maximum of the minimum distances to the threshold value. A pair of rigid members are identified as connected if the maximum of the minimum distance between the rigid members is smaller than threshold value identifying maximum allowable distance between connected rigid members. This process can be repeated for pairs of rigid member until a desired some or all potential pairs of rigid members have been evaluated for connectivity.

Determining connectivity of rigid members can include the computation of a graph, in which the nodes represent the piecewise-rigid members $\Omega^n$ and the edges describe a distance metric D. It is expected that the distance between two connected rigid members $\Omega^n$ and $\Omega^m$ is low. Therefore connected rigid members can be identified by determining the largest of a set of minimum distances between a pair of rigid members. This can be done according to:

$$D(n, m) = \frac{1}{|F|} \sum_{f \in F} \min \|S_f^n - S_f^m\|^2, \quad (9)$$

In Equation (9), where $S_f^n$ and $S_f^m$ are the 3D points belonging to $\Omega^n$ and $\Omega^m$ respectively. In some embodiments, and based on the above discussion with respect to block 902, a skeleton can then be estimated as the minimum spanning tree of that graph.

The locations of one or several joints connecting one or several pair of rigid members are identified in operation 904. A joint J can move arbitrarily in 3D space, but remains fixed in the local coordinate systems of two rigid components $\Omega^n$ and $\Omega^m$ that are linked via that joint. Additionally, the respective local joint coordinates $J_n$ and $J_m$ should match when the respective local joint coordinates $J_n$ and $J_m$ are converted to non-local coordinates. Thus:

$$R_f^n J^n + T_f^n = R_f^m J^m + T_f^m, \forall f \in F'. \quad (10)$$

Linear least squares technique can be used to solve for $J_n$ and $J_m$ of Equation (10). However, in the case in which the motions of two rigid members are very similar, the least squares solution will not be robust, and will result in noisy estimates. This problem can be remedied by constraining $J_n$ and $J_m$ to lie inside the bounding box of $\Omega^n$ and $\Omega^m$. In some embodiments, this bounding box can be scaled by a factor of 1.5 for robustness. This further constrained problem can then be solved using a standard constrained linear least squares solver In operation 906 identified joints are applied to the mathematical model of the articulated object to restrict the motion of the piecewise-rigid members. The following recursive function expresses the global, three-dimensional positions of the objects $\Omega^n$ in a hierarchical manner:

$$w(n, f, \Omega^n) = \begin{cases} R_f^n \Omega^n + T_f^n & \text{if } n \text{ is root} \\ R_f^n \Omega^n + w(p(n), f, J_n) & \text{otherwise} \end{cases} \quad (11)$$

In Equation (11), the rigid member can be the root if it is identified as a rigid member whose position is defined independent of the positions of other rigid members of the articulated object. An example of such a rigid member is a rigid member connecting the articulated object to the ground. In Equation (11), p(n) is the parent of $\Omega^n$ in the minimum spanning tree.

The three-dimensional positions of the rigid members as provided in Equation (11) can be compared to the 2D feature points to determine a reprojection error. This comparison is performed by the projection of the rigid members, and particularly of the three-dimensional positions of the rigid members back to the images and/or back to 2D space. This projection can be performed using camera calibration data which can be stored in the one or several calibration matrices $P_f$. This reprojection error can be minimized by an optimization function that can include a smoothness parameter. Specifically, Equation (11) can be substituted into Equation (7) to yield:

$$\min_{\Omega, R, T} \sum_{f=1}^{F} \sum_{n=1}^{N} \|w_f^n - P_f(w(n, f, \Omega^n))\|^2, \quad (12)$$

This equation can be optimized with the CERES-solver. Also, and as in Equation (8), a temporal smoothness constraint can be applied as a regularizer. After the identified joints are applied to the mathematical model of the articulated object to restrict the motion of the piecewise-rigid members, the process 500 proceeds to operation 520.

d. Results

Figure 10:
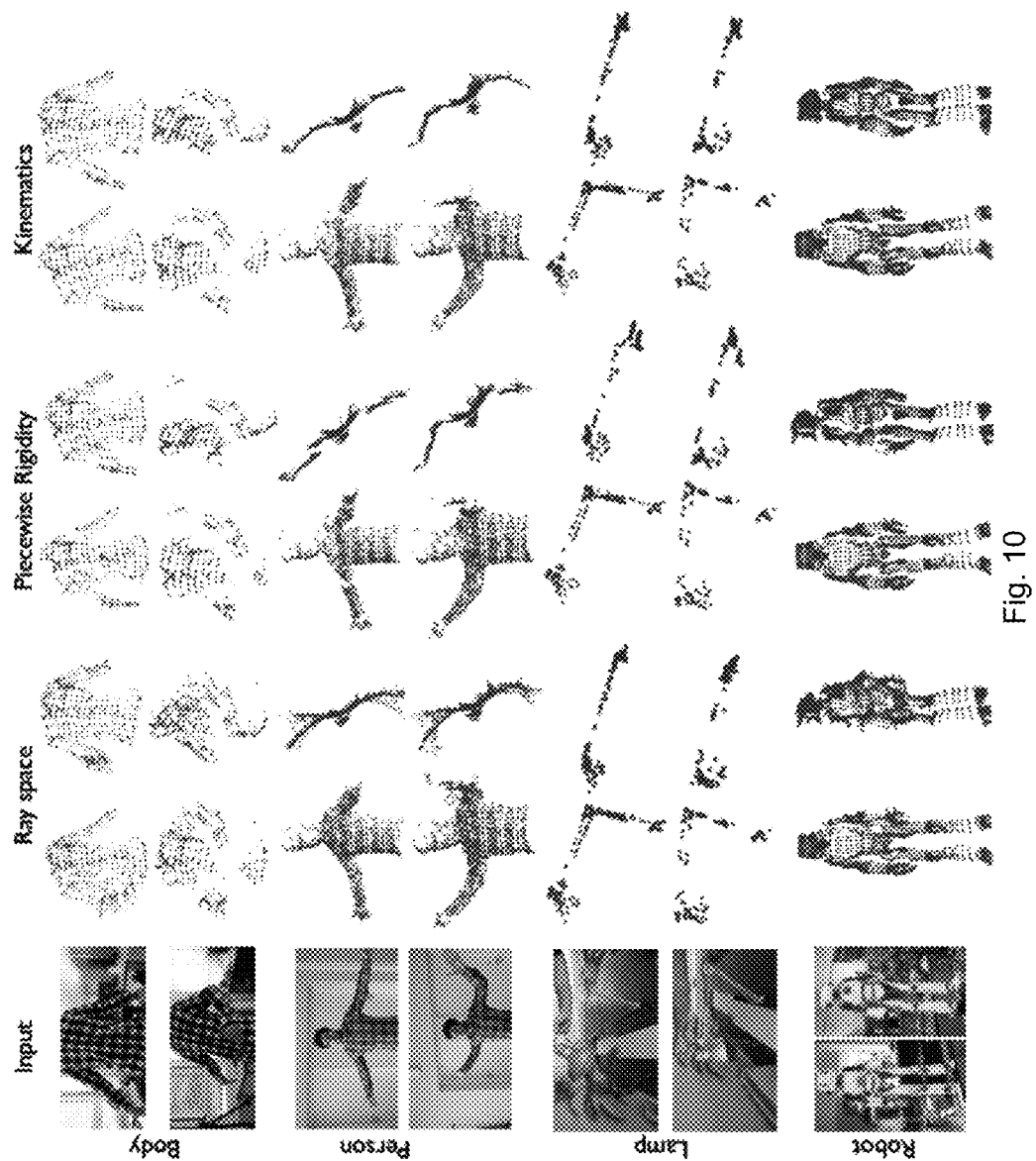
FIG. 10 includes a series of images showing the results of the application of methods disclosed herein.

FIG. 10 contains image data showing the results of the application of the above discussed methods for reconstruction of articulated objects from a moving camera. This figure includes eight input images arranged in a row of input images. These input images include input images showing a body, input images showing a person, input images showing a lamp, and input images showing a robot. The figure further includes, from left to right, a column identified as ray space, a column identified as piecewise rigidity, and a column identified as kinematics, which columns track the progression of the methods discussed herein.

Each of these columns of FIG. 10 contains datasets for each of the input images. Viewing the datasets, from left to right, it is evident that the application of the methods disclosed herein decrease the noise in the datasets, and that the articulated motion becomes more realistic.

VI. System

FIG. 11 shows a block diagram of computer system 1000 that is an exemplary embodiment of reconstruction computer 102 and can be used to implement methods and processes. FIG. 11 is merely illustrative. Computer system 1000 may include familiar computer components, such as one or more one or more data processors or central processing units (CPUs) 1005, one or more graphics processors or graphical processing units (GPUs) 1010, memory subsystem 1015, storage subsystem 1020, one or more input/output (I/O) interfaces 1025, communications interface 1030, or the like. Computer system 1000 can include system bus 1035 interconnecting the above components and providing functionality, such connectivity and inter-device communication.

The one or more data processors or central processing units (CPUs) 1005 execute program code to implement the processes described herein. The one or more graphics processor or graphical processing units (GPUs) 1010 execute logic or program code associated with graphics or for providing graphics-specific functionality. Memory subsystem 1015 can store information, e.g., using machine-readable articles, information storage devices, or computer-readable storage media. Storage subsystem 1020 can also store information using machine-readable articles, information storage devices, or computer-readable storage media. Storage subsystem 1020 may store information using storage media 1045 that can be any desired storage media.

The one or more input/output (I/O) interfaces 1025 can perform I/O operations and the one or more output devices 1055 can output information to one or more destinations for computer system 1000. One or more input devices 1050 and/or one or more output devices 1055 may be communicatively coupled to the one or more I/O interfaces 1025. The one or more input devices 1050 can receive information from one or more sources for computer system 1000. The one or more output devices 1055 may allow a user of computer system 1000 to view objects, icons, text, user interface widgets, or other user interface elements.

Communications interface 1030 can perform communications operations, including sending and receiving data. Communications interface 1030 may be coupled to communications network/external bus 1060, such as a computer network, a USB hub, or the like. A computer system can include a plurality of the same components or subsystems, e.g., connected together by communications interface 1030 or by an internal interface.

Computer system 1000 may also include one or more applications (e.g., software components or functions) to be executed by a processor to execute, perform, or otherwise implement techniques disclosed herein. These applications may be embodied as data and program code 1040. Such applications may also be encoded and transmitted using carrier signals adapted for transmission via wired, optical, and/or wireless networks conforming to a variety of protocols, including the Internet.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of reconstructing an articulated object from images captured with a moving camera, the method comprising:
    generating a plurality of 2D tracks, wherein at least one of the 2D tracks of the plurality of 2D tracks comprises a plurality of 2D feature points, wherein one of the 2D feature points identifies a two-dimensional location of a unique one of a series of points on an articulated object in a one of a sequenced series of captured images, wherein the sequenced series of captured images are captured by a moving camera, and wherein the moving camera is moving with respect to at least a fixed portion of a background of the images forming the sequenced series of captured images;
    generating a manifold of rays comprising a plurality of rays, wherein the rays of the manifold of rays are defined in part as extending through a unique one of the data points of one of the 2D tracks;
    converting at least some of the plurality of 2D data points of the plurality of 2D tracks to 3D data points by identifying a position for at least one of the plurality of 2D data points along one of the plurality of rays forming the manifold of rays; and
    generating a first 3D representation of the articulated object for each of the images of the sequenced series of captured images, wherein the first 3D representation comprises the 3D data points converted from 2D data points gathered from one of the images of the sequenced series of captured images.

2. The method of claim 1, wherein the plurality of 2D data points together identify a 2D location of the unique one of the series of points of the articulated object in each of the sequenced series of captured images.

3. The method of claim 1, wherein generating the manifold of rays comprises:
    identifying a lens center for a lens of the moving camera for each of the plurality of the images forming the sequenced series of captured images; and
    generating a plurality of rays, wherein a ray extends through a pair of a lens center for one of the images forming the sequenced series of captured images and at least one 2D feature point for that one of the images forming the sequenced series of captured images.

4. The method of claim 3, wherein a unique ray is generated for each pair of one lens center and one 2D feature point for each of the images forming the sequenced series of images.

5. The method of claim 3, wherein generating a manifold of rays comprises generating a plurality of manifolds or rays, wherein one of manifolds of rays forming the plurality of manifolds of rays is generated for each of the plurality of 2D tracks.

6. The method of claim 5, wherein identifying a position for at least some of the plurality of 2D data points along the each of the plurality of rays forming the manifold of rays comprises:
    generating a first energy function the result of which is based on the magnitude of difference in the positions of temporally adjacent 3D data points along their respective ray; and
    adjusting the position of the 3D data points to minimize the result of the first energy function.

7. The method of claim 6, further comprising refining the first 3D representation of the articulated object by applying piecewise rigidity constraints, wherein applying piecewise rigidity constrains comprises:
  identifying first and second groups of 3D data points as belonging to common first and second rigid members;
  generating first and second rigid objects corresponding to the identified groups of 3D data points belonging to the first and second common rigid members;
  determining the rotation and translation of the first and second rigid objects from one image of the sequenced series of captured images to a temporally adjacent image of the sequence of captured images;
  generating a second 3D representation of the articulated object for each of the images based on the generated first and second rigid objects and the determined rotation and translation of the generated first and second rigid objects;
  determining the error between the second 3D representation and the 2D tracks; and
  refining the determined rotation and translation of the first and second rigid objects to minimize the error between the second 3D representation and the 2D tracks.

8. The method of claim 7, wherein refining the determined rotation and translation of the first and second rigid objects to minimize the error between the second 3D representation and the 2D tracks comprises adjusting the determined error with a smoothness parameter.

9. The method of claim 7, further comprising generating a third 3D representation of the articulated object by applying kinematic constraints to the second 3D representation.

10. The method of claim 9, wherein applying kinematic constraints comprises:
  determining the distance between the first and second rigid members for each image of the sequenced series of captured images;
  determining the variation in the determined distances between the first and second rigid members; and
  identifying a joint if the determined distance between the first and second rigid members and the variation in the determined distances between the first and second rigid members indicate the presence of a joint.

11. The method of claim 9, wherein applying kinematic constraints comprises:
  determining the position of the first rigid member based on the rotation and translation of the first rigid member;
  determining the position of the second rigid member based on the rotation and translation of the second rigid member and the determined position of the first rigid member;
  generating the third 3D representation based on the determined position of the first and second rigid members;
  determining the error between the third 3D representation and the 3D tracks;
  refining the determined positions of the first and second rigid members to minimize the error between the third 3D representation and the 2D tracks.

12. A system for reconstructing an articulated object from images captured with a moving camera, the method comprising:
  memory comprising stored instructions; and
  a processor configured to:
    generate a plurality of 2D tracks, wherein at least one of the 2D tracks of the plurality of 2D tracks comprises a plurality of 2D data points identifying 2D locations of a unique one of a series of points on an articulated object in a one of a sequenced series of captured images, wherein the sequenced series of captured images are captured by a moving camera, and wherein the moving camera is moving with respect to at least a fixed portion of a background of the images forming the sequenced series of captured images;
    generate a manifold of rays comprising a plurality of rays, wherein the rays of the manifold of rays are defined in part as extending through a unique one of the data points of one of the 2D tracks;
    convert at least some of the plurality of 2D data points of the plurality of 2D tracks to 3D data points by identifying a position for at least some of the plurality of 2D data points along the each of the plurality of rays forming the manifold of rays; and
    generate a first 3D representation of the articulated object for each of the images of the sequenced series of captured images, wherein the first 3D representation comprises the 3D data points converted from 2D data points gathered from one of the images of the sequenced series of captured images.

13. The system of claim 12, wherein the plurality of 2D data points together identify a 2D location of the unique one of the series of points of the articulated object in each of the sequenced series of captured images.

14. The system of claim 12, wherein generating the manifold of rays comprises:
  identifying a lens center for a lens of the moving camera for each of the plurality of the images forming the sequenced series of captured images; and
  generating a plurality of rays, wherein a ray extends through a pair of a lens center for one of the images forming the sequenced series of captured images and the 2D data point for that one of the images forming the sequenced series of captured images.

15. The system of claim 14, wherein a unique ray is generated for each pair of one lens center and one 2D data point for each of the images forming the sequenced series of images.

16. The system of claim 15, wherein generating a manifold of rays comprises generating a plurality of manifolds or rays, wherein one of manifolds of rays forming the plurality of manifolds of rays is generated for each of the plurality of 2D tracks.

17. The system of claim 16, wherein identifying a position for at least some of the plurality of 2D data points along the each of the plurality of rays forming the manifold of rays comprises:
  generating a first energy function the result of which is based on the magnitude of difference in the positions of temporally adjacent 3D data points along their respective ray; and
  adjusting the position of the 3D data points to minimize the result of the first energy function.

18. The system of claim 17, wherein the processor is further configured to refine the first 3D representation of the articulated object by applying piecewise rigidity constraints, wherein applying piecewise rigidity constrains comprises:
  identifying first and second groups of 3D data points as belonging to common first and second rigid members;
  generating first and second rigid objects corresponding to the identified groups of 3D data points belonging to the first and second common rigid members;
  determining the rotation and translation of the first and second rigid objects from one image of the sequenced series of captured images to a temporally adjacent image of the sequence of captured images;

generating a second 3D representation of the articulated object for each of the images based on the generated first and second rigid objects and the determined rotation and translation of the generated first and second rigid objects;

determining the error between the second 3D representation and the 2D tracks; and refining the determined rotation and translation of the first and second rigid objects to minimize the error between the second 3D representation and the 2D tracks.

19. The system of claim 18, wherein refining the determined rotation and translation of the first and second rigid objects to minimize the error between the second 3D representation and the 2D tracks comprises adjusting the determined error with a smoothness parameter.

20. The system of claim 19, wherein the processor is further configured to generate a third 3D representation of the articulated object by applying kinematic constraints to the second 3D representation.

21. The system of claim 20, wherein applying kinematic constraints comprises:

determining the distance between the first and second rigid members for each image of the sequenced series of captured images;

determining the variation in the determined distances between the first and second rigid members; and identifying a joint if the determined distance between the first and second rigid members and the variation in the determined distances between the first and second rigid members indicate the presence of a joint.

22. The system of claim 20, wherein applying kinematic constraints comprises:

determining the position of the first rigid member based on the rotation and translation of the first rigid member;

determining the position of the second rigid member based on the rotation and translation of the second rigid member and the determined position of the first rigid member;

generating the third 3D representation based on the determined position of the first and second rigid members;

determining the error between the third 3D representation and the 3D tracks; and refining the determined positions of the first and second rigid members to minimize the error between the third 3D representation and the 2D tracks.

* * * * *

UNITED STATES PATENT AND TRADEMARK OFFICE
CERTIFICATE OF CORRECTION

PATENT NO. : 9,747,668 B2
APPLICATION NO. : 15/003650
DATED : August 29, 2017
INVENTOR(S) : Kaan Yücer et al.

It is certified that error appears in the above-identified patent and that said Letters Patent is hereby corrected as shown below:

On the Title Page

Item (73), Assignee:
Replace "DISNEY ENTERPRIES, INC., Burbank, CA (US); ETH ZÜRICH (EIDGENÖESSISCHE TECHNISCHE HOCHSCHULE ZÜRICH), Zürich (CH)" with --DISNEY ENTERPRIES, INC., Burbank, CA (US); ETH ZÜRICH (EIDGENÖSSISCHE TECHNISCHE HOCHSCHULE ZÜRICH), Zürich (CH)--

Item (57) ABSTRACT, Line 2:
Replace "object are disclosed herein, The articulated object can be" with --object are disclosed herein. The articulated object can be--

In the Claims

At Column 20, Claim 14, Line 1:
Replace "14. The system of claim 12, wherein generating the" with --14. The system of claim 13, wherein generating the--

Signed and Sealed this
Twentieth Day of March, 2018

Andrei Iancu
*Director of the United States Patent and Trademark Office*